(12) United States Patent
Kent et al.

(10) Patent No.: US 8,037,015 B2
(45) Date of Patent: Oct. 11, 2011

(54) FLEXIBLE INTERFACE USING SCALABLE VECTOR GRAPHICS WITH METALEVEL PALETTE

(75) Inventors: James Kent, Gahanna, OH (US);
Elizabeth Dykstra-Erickson, San Francisco, CA (US); Daniel F. Zucker, Palo Alto, CA (US); Jeffrey Paul Anderson, Clovis, CA (US)

(73) Assignee: Access Co., Ltd., Tokyo (JP)

( * ) Notice: Subject to any disclaimer, the term of this patent is extended or adjusted under 35 U.S.C. 154(b) by 353 days.

(21) Appl. No.: 12/026,540

(22) Filed: Feb. 5, 2008

(65) Prior Publication Data
US 2008/0275903 A1   Nov. 6, 2008

Related U.S. Application Data

(60) Provisional application No. 60/888,537, filed on Feb. 6, 2007.

(51) Int. Cl.
*G06F 17/00* (2006.01)

(52) U.S. Cl. ......................................... 707/602; 345/418
(58) Field of Classification Search .................. 707/602, 707/609, 705, 802, E17.116, E17.122; 345/418, 345/600, 629
See application file for complete search history.

(56) References Cited

U.S. PATENT DOCUMENTS
2004/0119726 A1 * 6/2004 Li .................................. 345/629

OTHER PUBLICATIONS

Chatty et al; Revisiting Visual Interface Programming: Creating GUI Tools for Designers and Programmers, 2004, ACM, pp. 267-276.*

* cited by examiner

*Primary Examiner* — Fred I Ehichioya
(74) *Attorney, Agent, or Firm* — Berry & Associates P.C.

(57) ABSTRACT

The present invention provides a method and system of storing information for drawing an object on a computer system that includes providing a palette file that includes a set of first labels matched with numerical values, tagging a vector graphics file for drawing the object with second labels, translating the second labels into one or more of the first labels, and plugging in values stored in the palette file associated with the translated second labels into the tagged vector graphics file.

9 Claims, 4 Drawing Sheets

FLEXIBLE INTERFACE USING SCALABLE VECTOR GRAPHICS WITH METALEVEL PALETTE

PRIORITY CLAIM

The present invention claims the benefit under 35 U.S.C. §119(e) of U.S. Provisional Patent Application No. 60/888,537 filed on Feb. 6, 2007 and entitled "Flexible Interface Using Scalable Vector Graphics with Metalevel Palette", the contents of which are incorporated herein by reference and are relied upon here.

BACKGROUND OF THE INVENTION

1. Field of the Invention

The present invention relates to user interfaces generated and displayed on electronic systems and devices. More particularly, the present invention relates to a system and method for customizing the appearance of a user interface using a palette file.

2. Introduction

Existing electronic systems and devices (hereinafter referred to collectively as electronic devices) having processing capability, such as mobile devices (e.g., cell phones, personal digital assistants) and information appliances, typically have display screens on which user interfaces are presented. The user interfaces allow users a measure of control over the applications running on the electronic device and also may be used to access and display information stored on the device. With the increasing sophistication of software applications, user interfaces have becoming increasingly complicated as well, and in some cases, up to 2500 bitmap image files are needed to render a user interface in a display.

At the same time, many users of electronic devices demand a variety of designs, while device providers would like to provide a uniform user experience. In order to deploy the same user interface on multiple electronic devices having different screen sizes, many of the user interface images need to be regenerated at slightly different dimensions. For example, mobile telephone carriers develop many different sets of these elements to customize a mobile device or mobile phone for a certain market or type of activity, repeating the process for each specific handset, which is time consuming, costly, and requires significant storage space on the device.

Additionally, there is continued and increasing interest in the ability to quickly generate a very different user experience and load it to a device that has already been purchased and is in use, offering the user a choice of "schemes." Such schemes include offerings tuned to business, sports, world events, or special interests where graphical identity is key. Simple color changes, or "theming," does not necessarily satisfy this need. Further property changes including color, strokes, shapes, fills, size, transitions, and effects, or "scheming," may better achieve desired end result.

What is therefore needed is an efficient system and method for varying the appearance of a complex user interface.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect, the present invention provides a method of storing information for drawing an object on a computer system that includes (1) providing a palette file that includes a set of first labels matched with numerical values, (2) tagging a vector graphics file for drawing the object with second labels, (3) translating the second labels into one or more of the first labels, and (4) plugging in values stored in the palette file associated with the translated second labels into the tagged vector graphics file.

In a second aspect, the present invention provides a method of drawing an object on a computer system comprising generating actual configuration files from master configuration files for by applying values stored in a palette file, generating an actual vector graphics file by applying values in an actual configuration file to a vector graphics file for drawing the object, and drawing the object from instructions in the actual configuration files and the actual vector graphics file.

In a third aspect, the present invention provides a computer system comprising:
a display, a memory unit storing a palette file and one or more master configuration files for drawing an object, and a processor coupled to the display and memory unit and adapted to i) generate actual configuration files from the master configuration files by applying values stored in the palette file, ii) generate an actual vector graphics file by applying values in a configuration file to a vector graphics file, and iii) draw the object on the display based on instructions in the actual configuration files and the actual vector graphics file.

DETAILED DESCRIPTION OF THE INVENTION

In order to describe the manner in which the above-recited and other advantages and features of the invention can be obtained, a more particular description of the invention briefly described above will be rendered by reference to specific embodiments thereof, which are illustrated in the appended drawings. The present invention will be described and explained with additional specificity and detail through the use of the following drawings.

User interfaces are generated using a number of different types of files. In some embodiments, the files from which a user interface is generated include 1) configuration files that are used to draw 'widgets' are the specific objects and textures in the interface, 2) image files used for drawing icons, backgrounds and widget subparts, and 3) an XML configuration file for a window manager to control the appearance of window decorations. In alternative embodiments, other combinations of files may be used.

The configuration files, which use the GTK+ library, define the colors, fonts, sizes and shapes of the various elements of the user interface. In some embodiments, the GTK+ widget drawing system makes use of GTK+ resource files to define drawing styles that may be applied to various classes of widgets. The image files are preferably in vector format (e.g., SVG (Standard Vector Graphics) format). The vector graphics files may reference external cascading style sheet (CSS) files that define properties such as colors, opacity and stroke widths. For example, an exemplary image file for a button <button.svg>, which includes XML text, may include a text line referencing to a .CSS file:

<?xml-stylesheet href="/buttonstyle.css"> as well as a line linking a graphics feature "stop id" with an analogous feature in the CSS file:

<stop id="firstStop" offset=0/> while the CSS file <buttonsytle.css> includes the corresponding line of text firstStop<stop-color: Light Blue>.

In this manner, the color of the feature defined by the SVG file <button.svg> is obtained from the CSS file <buttonstyle.css> and in the example given is light blue, but the CSS file may associate the feature with other colors.

The present invention provides a higher-level configuration mechanism to synchronize the configuration files. In particular, a palette file is used to automatically generate the lower-level configuration files (e.g., GTK+ resource, CSS and XML (SVG) files). The palette file includes a set of label/value pairs. A master version of lower-level configuration files is generated that uses the labels identified in the palette instead of explicit values. For example, the palette file may include an entry:

<FocusColor> magenta

In the master configuration files, the string <FocusColor>, which refers to a graphical feature, will appear instead of the color value "magenta". As indicated, the values may define a color, but in other cases may also define fonts, sizes and shapes.

Figure 1A:
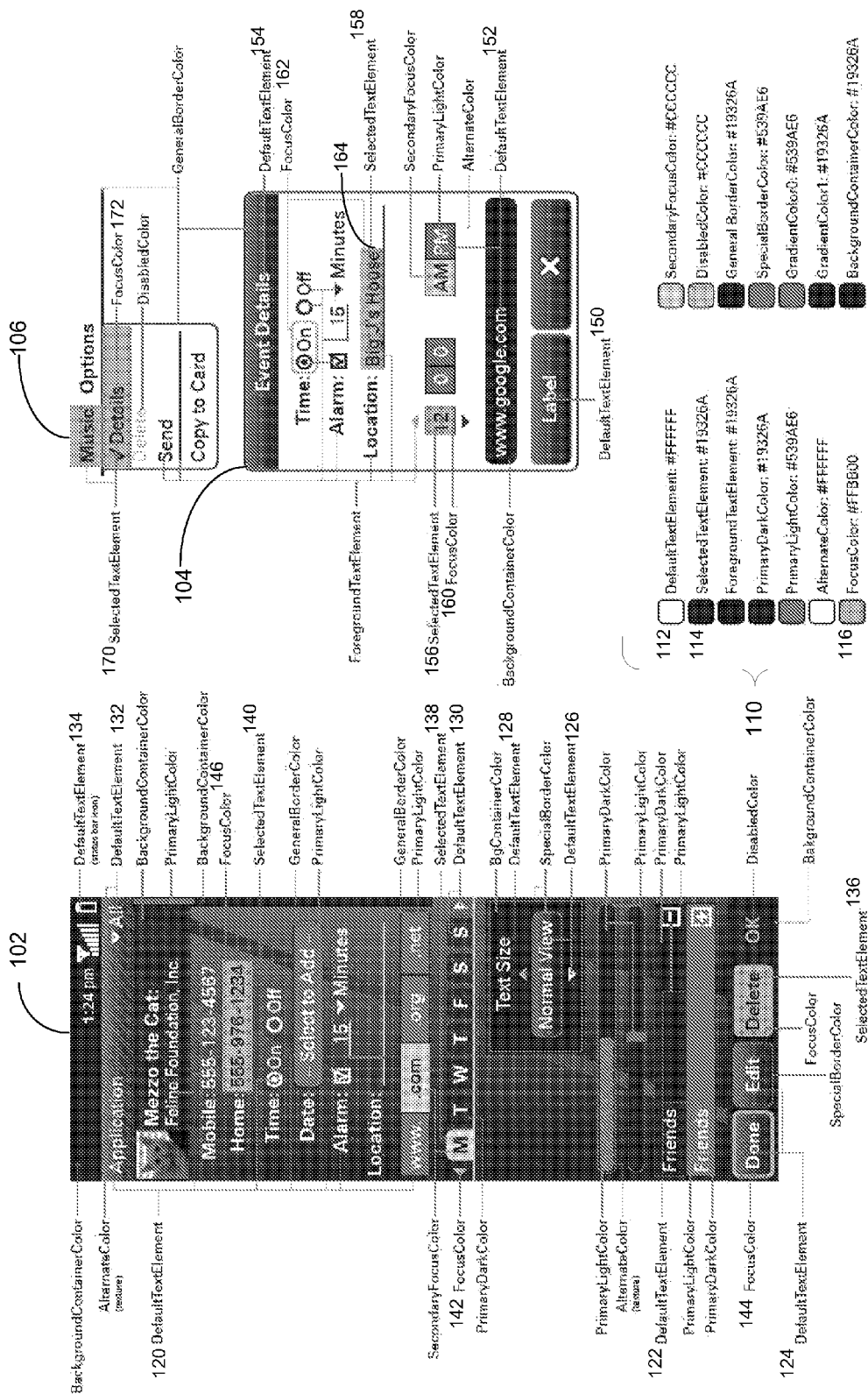
FIG. 1A illustrates a set of dialog boxes configured using a palette file according to the method of the present invention.
Figure 1B:
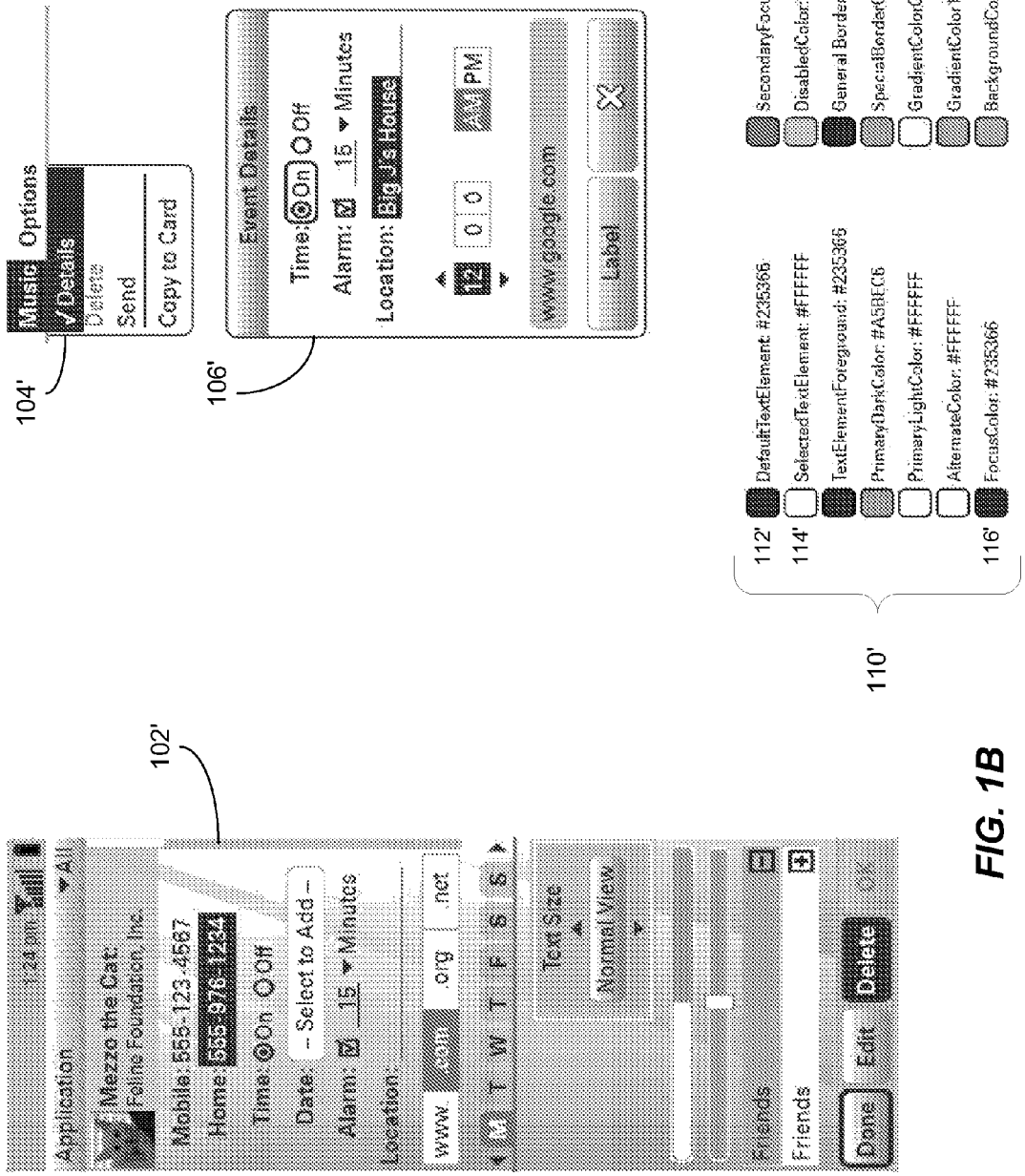
FIG. 1B illustrates changes to the set of dialog boxes shown in FIG. 1A in response to changes in the palette file according to the present invention.

FIGS. 1A and 1B show example dialog boxes that illustrate the use of a palette file according to the present invention to change colors of graphical features within several files by assigning different colors within the single palette file.

FIG. 1A shows three (3) dialog boxes 102, 104, 106, each generated using different graphical files (e.g., GTK configuration files, SVG and CSS files). The first dialog box 102 is an appointment box/form that includes numerous graphical features to hold various types of information. The second dialog box 104 is a form for entering the time and location details of an event and includes several graphical features. The third dialog box 106 is a drop-down box from a "Music" category of a menu and includes a small number of graphical features.

Located at the bottom right of FIG. 1A is a list 110 in which colors are matched with labels that identify graphical features. The list 110 is a representation of the label/color entries of the palette file (not shown in FIG. 1A) where the colors for each of the graphical features are set. For example, entry 112 indicates that the color white is matched with the label "DefaultTextElement". Similarly, entry 114 indicates that the color dark blue is matched with the label "SelectedTextElement" and entry 116 indicates that the color orange is matched with the label "FocusColor". Although other entries of the list 110 are not labeled with reference numbers for the sake of brevity, it is understood that the other color/label entries function in the same manner.

Turning again to the first dialog box 102, it can be discerned that each graphical feature labeled as a DefaultTextElement 120, 122 . . . 134 is colored white, all graphical features labeled as SelectedTextElement 136, 138, 140 are colored dark blue, and all graphical features labeled as FocusColor 142, 144, 146 (the boxes holding the selected text) are colored orange.

With regard to the second dialog box 104, which is produced using different files that those used for generating dialog box 102, the graphical features labeled as DefaultTextElement 150, 152, 154 are also colored while, the graphical features labeled as SelectedTextElement 156, 158 are colored dark blue, and the graphical features labeled as FocusElement 160, 162, 164 are colored orange. The third dialog box includes a SelectedTextElement 170 with a FocusColor 172.

Turning to FIG. 1B, the global effects of changes made in the palette file may be perceived. In the color/label listing 110' located in the bottom right of FIG. 1B it can be seen that the color matched to "DefaultTextElement" in entry 112' has been changed from white to dark blue, the color matched to the "SelectedTextElement" in entry 114' has been changed from dark blue to white, and the color matched to "FocusColor" in entry 116' has been changed to dark blue. This change in the palette file is automatically transferred to the graphics files of the dialog boxes 102', 104', 106' using the palette file according to the present invention. More specifically, all of the DefaultTextElement features of dialog boxes 102, 104, 106 (120, 122 . . . 134 (dialog box 102) and 150, 152, 154 (dialog box 104)) have changed from while (in FIG. 1A) to dark blue (in FIG. 1B); all of the SelectedTextElement features (136, 138, 140 (dialog box 1), 156, 158 (dialog box 2) and 170 (dialog box 3) have changed from dark blue to while; and all of the FocusColor features (142, 144, 146 (dialog box 1), 160, 162, 164 (dialog box 2) and 172 (dialog box 3). In this manner, changing the values of three variables in the palette file (the colors of DefaultTextElement, SelectTextElement and FocusColor, respectively) results in changes in twenty-four (24) graphical features. This economizes on the amount of memory needed to store actual values (color, size, font, shape) of graphical features in a user interface.

Figure 2:
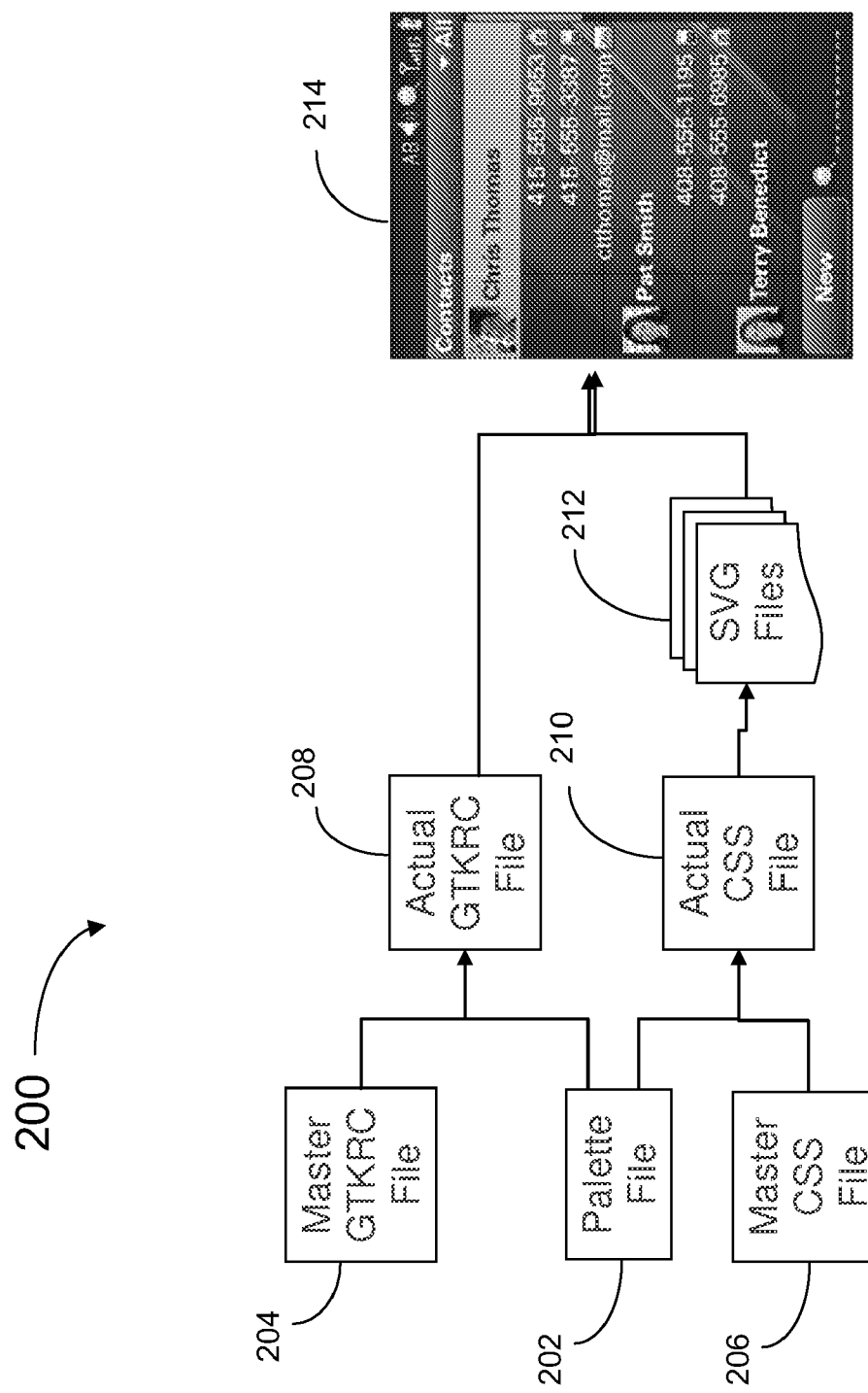
FIG. 2 is a flow diagram of a method for drawing a graphical feature using a palette file according to an embodiment of the present invention.

FIG. 2 is flow diagram of a method 200 of generating graphical features of a user interface using a palette file according to an embodiment of the present invention. A palette file 202 includes a list of label/value pairs to be used in generating lower-level configuration files. A master GTKRC file 204 defines colors, fonts and other style attributes to draw text and GTK widgets without final numerical values for these attributes. Similarly, a master CSS file 206 includes labels or tags for use in vector graphics image files and refers to color labels without numerical values for the colors. As explained in greater detail below, the palette file 202 is referenced by the master GTK file 204 and master CSS file 206 to produce an actual GTKRC file 208 and an actual CSS file 210, respectively. An actual GTKRC file 208 is generated by plugging in values stored in the palette file 202 into the corresponding labels in the master GTKRC file 208. Similarly, an actual CSS file 210 is generated by plugging in values stored in the palette file 202 into the corresponding labels in the master CSS file 206. Vector graphics image files 212 (e.g., SVG files) are generated using the actual CSS file 210. The user interface 214 is generated using the actual GTK file 208 and the vector graphics image files 212.

Figure 3:
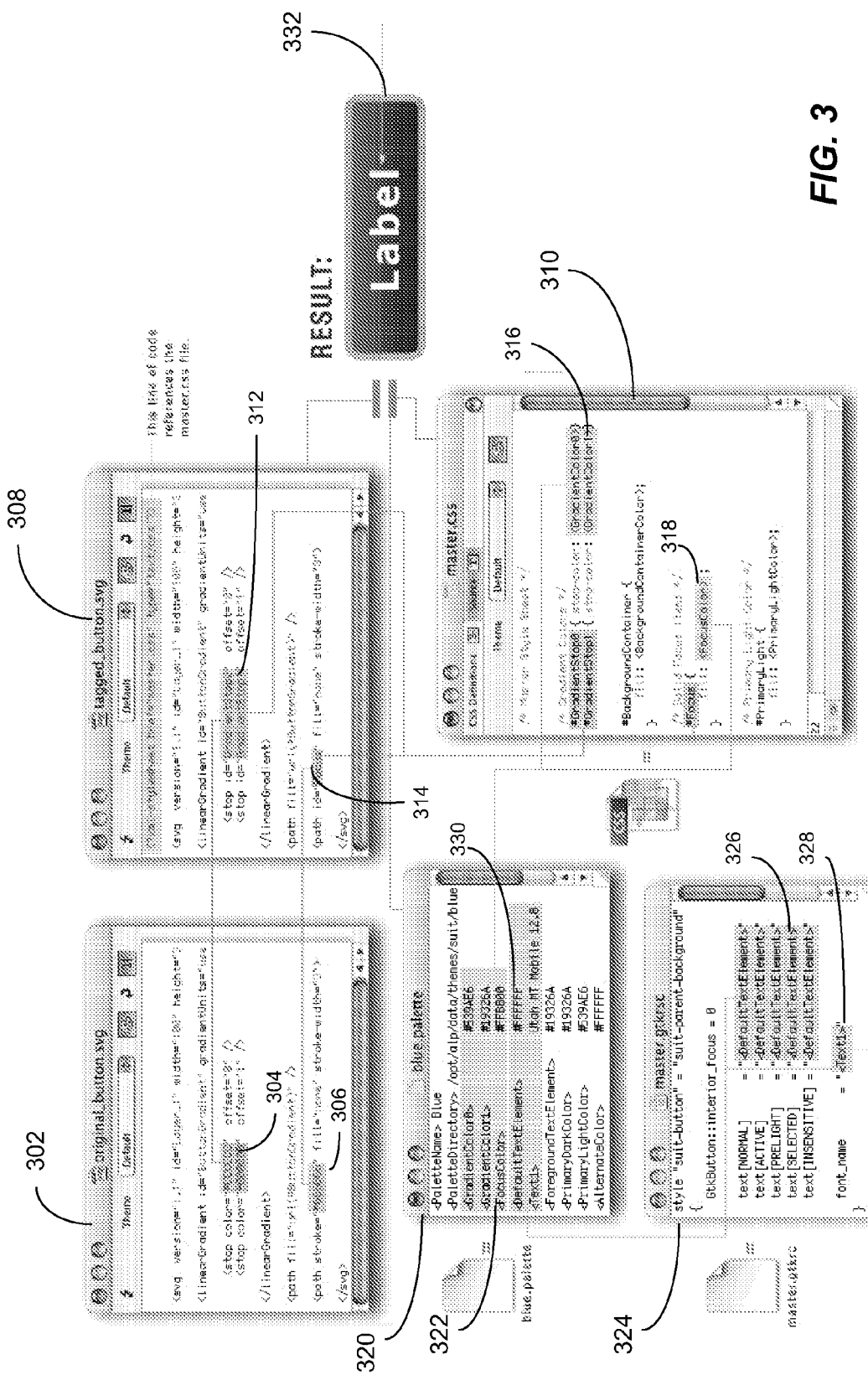
FIG. 3 is a more detailed flow diagram of a method for drawing a graphical feature using a palette file according to an embodiment of the present invention.

FIG. 3 is a flow diagram illustrating the method shown in FIG. 2 in greater detail. A vector graphics image file 302 named <Original.button.svg> (hereinafter referred to as the button file) includes information for creating a button with certain size, color and border attributes, representing original artwork. Within the button file 302, certain text is highlighted. In particular, hexadecimal values for stop 304 and stroke 306 colors are indicated.

In a process step A1, which may occur at run time, the button file is converted into a tagged button file 308 by adding a reference to the master CSS file 310 <master.css>, removing the hexadecimal values from the color terms and substituting labels 312, 314 from the master CSS file 306. In step A2, within the master CSS file 310, the labels substituted into the tagged button file 308 are matched with color labels 316, 318. For example, the label GradientStop1 in both the tagged button file 308 and master CSS file 310 is matched with GradientColor1 in color label 316. In step A3, the color IDs 316, 318 are matched with numerical values stored in the palette file 320. In the depicted embodiment, the color labels <GradientColor0>, <GradientColor1> and <FocusColor> in highlighted area 322 are matched with hexadecimal values. In this manner the color and size attributes of the button feature are set. In the depicted example, the button is blue (Gradient Color) with a slight color gradient and an orange border (Focus Color).

Either before, during or after steps A1-A3, a parallel step B1 takes place in which the master GTK file 324 <master.gtkrsc> includes tags for text and font values, references the palette file 320. In the depicted embodiment, the tags ("DefaultTextElement" and "Text1") are within highlighted areas 326, 328 of the master GTK file 324 which provide the text inside the button and its font. The hexadecimal value of the DefaultTextElement 330 in the palette file 320 translates to the text "Label".

In step A4/B2 the button 332 is drawn using the color and size obtained in steps A1-A3 and the text and font from step B1. In this manner, the palette file acts as a single source for the information that is used to set variables in configuration files, to modify vector graphics files, and to thereby generate graphical features.

In addition to assisting with the synchronization of the numerous configurations that may be used to generate complex user interfaces, the palette file provided according to the present invention is a very powerful design tool. Designers are able to experiment with the various attributes defined in the palette files, and then generate the required configuration files to review their selections.

The system and method of present invention is also beneficial in terms of reducing storage requirements. Palette files are considerably smaller than configuration files that they are used to generate, resulting in considerable savings over explicitly storing different versions of each configuration file for each variation in color or style.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of drawing a graphical feature on a computer system comprising:
    using a processor to:
    generate actual configuration files from master configuration files by applying values stored in a palette file wherein the palette file stores a set of labels matched with numerical values and wherein the actual configuration files are generated from master configuration files by plugging in to the master configuration file, for each label that exists in both the palette file and master configuration file, the value associated with each label;
    generate an actual vector graphics file by applying values in an actual configuration file to a vector graphics file for drawing the feature; and
    draw the graphical feature from instructions in the actual configuration files and the actual vector graphics file.

2. The method of claim 1, wherein the master configuration files include a master GTK+ file and master CSS file.

3. The method of claim 2, further comprising:
    tagging the vector graphics file with labels from the CSS file before generating the actual vector graphics file.

4. The method of claim 1, wherein the palette file stores one or more of color, size, font and shape information.

5. A computer system comprising:
    a display;
    a memory unit storing a palette file and one or more master configuration files for drawing a graphical feature; and
    a processor coupled to the display and memory unit and adapted to:
    generate actual configuration files from the master configuration files by applying values stored in the palette file wherein the palette file stores a set of labels matched with numerical values;
    generate an actual vector graphics file by applying values in a configuration file to a vector graphics file; and
    draw the graphical feature on the display based on instructions in the actual configuration files and the actual vector graphics file.

6. The computer system of claim 5, wherein the master configuration files include a master GTK+ file and master CSS file.

7. The computer system of claim 5, wherein the processor is further adapted to tag the vector graphics file with labels from the CSS file before generating the actual vector graphics file.

8. The computer system of claim 5, wherein the processor is further adapted to provide an interface whereby a user may modify the palette file.

9. The computer system of claim 5, wherein the palette file stores one or more of color, size, font and shape information.

* * * * *